United States Patent [19]

Whiting, Jr.

[11] 3,836,425
[45] Sept. 17, 1974

[54] THIN, FLEXIBLE BARRIER MATERIAL

[75] Inventor: Philip C. Whiting, Jr., Holyoke, Mass.

[73] Assignee: Ludlow Coporation, Needham Heights, Mass.

[22] Filed: Jan. 12, 1971

[21] Appl. No.: 105,853

[52] U.S. Cl................ 161/165, 161/190, 161/214, 161/216, 161/218, 161/227, 161/247, 161/252
[51] Int. Cl....................... B32b 27/08, B65d 31/02
[58] Field of Search........... 161/165, 214, 216, 218, 161/227, 190, 247, 252

[56] References Cited
UNITED STATES PATENTS

| | | | |
|---|---|---|---|
| 2,993,806 | 7/1961 | Fisher et al. | 161/218 |
| 3,078,201 | 2/1963 | Christie | 161/216 |
| 3,086,216 | 4/1963 | Brooks et al. | 161/218 |
| 3,233,815 | 2/1966 | Eggen | 161/218 |
| 3,288,664 | 11/1966 | Hoppe | 161/214 |
| 3,343,663 | 9/1967 | Seidler | 161/216 |
| 3,480,464 | 11/1969 | Lacy | 161/216 |
| 3,449,192 | 6/1969 | Hook | 161/216 |
| 3,556,816 | 1/1971 | Nughes | 161/214 |
| 3,616,190 | 10/1971 | Shaw | 161/216 |
| 3,669,692 | 6/1972 | Turbak | 161/216 |

*Primary Examiner*—Marion E. McCamish
*Attorney, Agent, or Firm*—Cesari & McKenna

[57] ABSTRACT

A fabric- and fiber-free, heat-sealable structure useful as a barrier material limiting passage through itself of solids, liquids, semisolids, gases or forms of energy such as ultraviolet light, said structure comprising a first ply of a relatively tough, biaxially-oriented film of an organic polymer adhered to a second ply of a metallic foil and a third ply of a tough polymer such as polyethylene. Such a laminated structure having a total thickness of less than ten mils (0.010) meets the requirements of the widely-known MIL-b-131 specification and is relatively non-directional in its strength characteristics.

18 Claims, 1 Drawing Figure

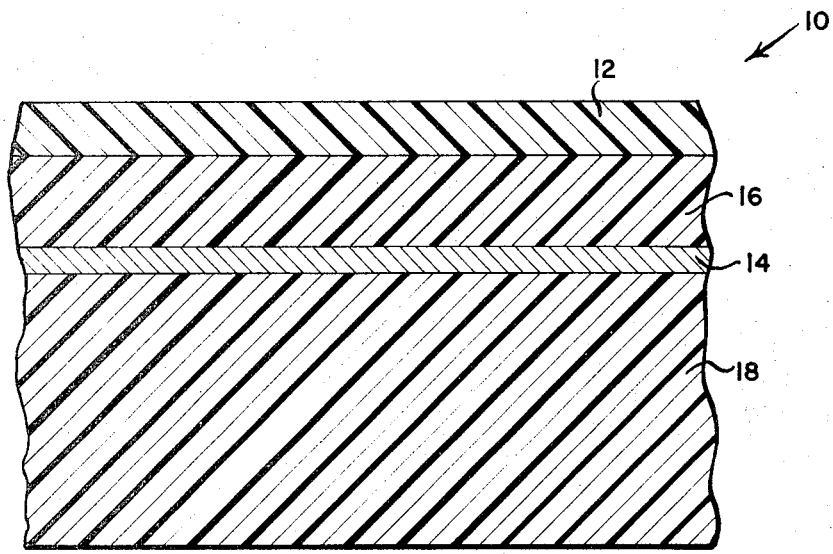

THIN, FLEXIBLE BARRIER MATERIAL

BACKGROUND OF THE INVENTION

This invention relates to a laminate structure suitable for use as a water vapor-proof, flexible and heatsealable barrier material having excellent physical properties and resistance to chemical attack.

Important criteria for such a barrier material is set forth in Military Specification MIL-B-131E and similar specifications. In general, such specifications call for certain minimum standards with respect to the following characteristics of any barrier material:
  heatsealability
  water vapor transmission rate (WVTR)
  delamination upon aging
  corrosion resistance
  oil resistance
  break strength and directional characteristics thereof
  low temperature vibration resistance
  impact resistance
  water resistance Elaborate test procedures have been established by the U.S. Government for measuring these characteristics. These tests will not be described in detail in this application because they are referenced, or set forth in detail, in MIL-B-131E dated 29 Dec. 1966 and any updated versions thereof.

Over the years, there has been considerable work done in constructing materials for use as suitable barrier layers. Probably the most generally-used construction is, or was until very recently, a laminate consisting essentially of a. a cotton scrim fabric (44 X 40) having an area of 5.8 yards long by 38 inches wide per pound of fabric, b. a layer of polyethylene laminated to the scrim in a thickness equivalent to 20 pounds of polyethylene per 3,000 feet$^2$ of scrim, c. an aluminum foil 0.00035 inches in thickness; the foil is laminated on one face to the aforesaid polyethylene layer and has the opposite face chemically primed for lamination to d. a second layer of polyethylene in a sheet weighing 45 pounds per 3,000 foot$^2$ This material was satisfactory in the sense that it meets the minimum standards for a barrier material. However, it was relatively expensive to manufacture and has a total thickness of about 0.015 inches. This thickness tends to interfere with the flexibility of the material, and thereby decreases the convenience with which it can be stored and manipulated.

In order to avoid some of the drawbacks associated with the above-described material, a porous, nonwoven polyethylene fabric of the type known as a spunbonded fabric and sold under the trade designation Tyvek by E. I. DuPont de Nemours and Company, Inc. was substituted for the woven scrim fabric. This proved advantageous because it reduced somewhat the amount of polyethylene required in layer (b) and also allowed a significant reduction in total thickness of the finished laminate structure from about 0.015 inches to about 0.011 inches. This barrier material comprising a spun-bonded polymeric fabric was also a major advance over the first material because it could be prepared at lower cost.

Nevertheless, further improvements were sought by the instant applicant in view of the desirability for a laminate of increased flexibility and lower cost. Moreover, the spun-bonded, fabric-containing laminate required considerable care in controlling heatsealing parameters, and this problem suggested the desirability of further improving barrier materials.

As will be pointed out below, applicant was not only successful in achieving these goals but was particularly alert to the possibility of achieving them while simultaneously making additional significant improvements in the performance of barrier-materials.

SUMMARY OF THE INVENTION

It is an object of the instant invention to provide a heatsealable barrier material of improved flexibility and capable of being manufactured at a relatively low cost in comparison to functionally-equivalent materials known to the prior art.

Another object of the invention is to provide a fabric-free barrier material having relatively small directional variation in its strength characteristics.

Another object of the invention is to provide a relatively thin barrier material which is characterized by an improved water vapor transmission rate after it has been subjected to flexing action of the type commonly encountered in the wrapping of articles.

Another object of the invention is to provide an improved protective package.

Other objects of the invention will be obvious to those skilled in the art on reading this application.

The above objects have been substantially achieved by the construction of a fabric-free laminate comprising a biaxially-oriented polymer film wherein the polymer is selected from impact-resistant polymeric materials, such as nylon, poly(ethylene terephthalate) and polypropylene. Of these polymers, nylon has a number of inherent advantages and is preferred for use in most applications because it can be utilized in the thinnest layers.

One additional advantage of the invention is an improved heat-sealing rate apparently made possible by the absence of any insulating fabric material in the laminate structure.

A laminate structure prepared according the instant invention will normally include four layers as follows:

1. the biaxially-oriented polymer film;
2. a relatively thin polymeric adhesive layer bonding the aforesaid biaxially-oriented polymer to
3. a metallic foil;
4. and a relatively thick and tough polymeric material usually a polyolefin such as polyethylene.

The biaxially-oriented polymer film must be tough and contribute impact strength to the laminate.

The polymeric adhesive is means for forming a bond between the biaxially-oriented polymer and the metal foil. Low density polyethylene is advantageously used.

The metal foil, advantageously aluminum because of its minimal cost and weight and corrosion resistance, provides ultra-violet light and water vapor barrier.

The relatively thick polymer film is usually low-density polyethylene and is particularly notalbe because of its good low-temperature physical characteristics and its ability to contribute a relatively thick, yet flexible, protective barrier to minimize the effects of any defects in the other materials, e.g., of any pinholes in the metal foil. However, poly(vinylchloride) or any other tough protective organic thermoplastic can conveniently serve as the thicker polymeric film.

ILLUSTRATIVE EMBODIMENT OF THE INVENTION

In this application and accompanying drawings are shown and described a preferred embodiment of the invention. Various alternatives and modifications thereof are suggested, but it is to be understood that these are not intended to be exhaustive and that other changes and modifications can be made within the scope of the invention. The suggestions herein are selected and included for purposes of illustration in order that others skilled in the art will more fully understand the invention and the principles thereof and will be able to modify it and embody it in a variety of forms, each as may be best suited in the condition of a particular case.

IN THE DRAWINGS

The drawing schematically illustrates a section of a barrier material constructed according to the invention.

Laminate structure 10 comprises a ply of biaxially-oriented nylon ply 12 about 0.0006 inches in thickness and of the type obtainable under the trade designation EMBLEM from Marubeni-Iida America Inc. of New York. Ply 12 is ahdesively attached to a ply 14 of an aluminum foil 0.00035 inches in thickness by a layer 16 of polyethylene. A further relatively thick ply 18 of polyethylene completes the structure 10. The polyethylene ply 18 usually consists of about 50 percent of the thickness of the barrier layer; the biaxially-oriented polymer film usually advantageously contributes less than 20 percent of the total thickness of the laminate structure.

The advantages of the invention over the prior art barrier materials were also achieved by substituting biaxially-oriented polypropylene and poly(ethylene terephthalate) films, each 0.00075 inches in thickness, for the nylon film.

The above described laminate is conveniently prepared according to the following procedure:

The biaxially-oriented nylon film is primed with about 0.5 pound (per 3,000 feet$^2$) of a polyurethane primer available from Morton Chemical Co. under the trade designation Adcote 335. Then a low density polyethylene, conveniently a polymer of 0.918 grams per cubic centimeter in density and a melt index of about 8, is extrusion-coated onto the primed film. This coating is conveniently carried out at an extrusion temperature of 610°–630F° (as measured at the extruder die) and line speeds of from 400 to 600 feet per minute.

Next, the aluminum foil is primed with the polyurethane primer and then coated with the same low density polyethylene, usually at a line speed of about 200–400 feet per minute.

The nylon and aluminum laminates are then combined to form a laminar structure according to the invention.

Test Data Illustrating Some of the Advantages of the Invention

The Water Vapor Transmission Rate (WVTR) of a material as described in the drawing was compared to the WVTRs of each of (1) a scrim-backed material and (2) a spunbonded-fabric-backed material of the types disclosed in the section of this application entitled "Background of the Invention."

This test is carried out by first exposing the test samples to flexing on a Gelbo Tester as described in Federal Test Method Standard No. 101B, Method 2017 dated Jan. 15, 1969 and entitled "Flexing Procedure for Barrier Materials." Thereupon the flexed samples are tested according to Federal Test Method Standard No. 101B, Method 3030 for their water vapor permeability characteristics.

The following results were obtained:

|  | WVTR* |
|---|---|
| Material of Invention | 0.010 |
| Scrim-backed Materials | 0.024 |
| Spunbonded-type Material | 0.019 |

*In terms of grams of moisture per 100 square inches per 24 hours

It is apparent that the WVTR of the thinner and more flexible product of the invention is only about one-half of the rate exhibited by the older materials. Moreover, the prior art laminates are about 25 to 70 percent more costly to manufacture than the laminates prepared according to the invention and, once manufactured, are more difficult to heatseal with respect to the rate at which the heatsealing may be carried out and/or with respect to the care required in controlling the heat, pressure, and time parameters of the heatsealing process.

It is also to be understood that the following claims are intended to cover all of the generic and specific features of the invention herein described and all statements of the scope of the invention which might be said to fall therebetween.

What is claimed is:

1. A fabric-free, heatsealable, flexible, barrier material consisting essectially of plys adhering together in the following sequence:
  a. a surface layer of biaxially-oriented polymeric film
  b. a adhesive bonding said biaxially-oriented film to
  c. a metal foil, and
  d. a protective ply of an organic thermoplastic polymer selected from poly(vinyl chloride) and polyethylene and wherein said barrier material passes MIL - B - 131 E.

2. A barrier material of claim 1 wherein the biaxially-oriented polymeric film is a sheet of less than about 0.0008 inches in thickness and the maximum composite thickness of the sheet is not above about 0.010 inch.

3. A barrier material of claim 2 wherein the biaxially-oriented material is nylon.

4. A barrier material as defined in claim 3 comprising a polyurethane primer material between said biaxially-oriented polymeric film and said adhesive.

5. A barrier material as defined in claim 3 wherein said adhesive is polyethylene.

6. A barrier material of claim 2 wherein the biaxially-oriented material is selected from polypropylene and poly(ethylene terephthalate) film.

7. A barrier material as defined in claim 2 comprising a polyurethane primer material between said biaxially-oriented polymeric film and said adhesive.

8. A barrier material as defined in claim 2 wherein said adhesive is polyethylene.

9. A barrier material as defined in claim 1 which is characterized by a water vapor transmission rate of less than about 0.012 grams per 100 square inches per 24 hours of test time after it has been flex-conditioned according to Federal Test Method Standard No. 101B.

10. A barrier material as defined in claim 1 comprising a polyurethane primer material between said biaxially-oriented polymeric film and said adhesive.

11. A barrier material as defined in claim 10 wherein said adhesive is polyethylene.

12. A barrier material as defined in claim 1 wherein said adhesive is polyethylene.

13. In a barrier material of improved flexibility, but of the type meeting the requirements of Military Specification MIL-B-131E, said material consisting of plys of polyethylene, aluminum, and an impact-resistant layer, the improvement wherein said impact-resistant layer is a biaxially-oriented polymeric film having a thickness of less than 0.0008 inch and comprising less than about 20 percent of the total thickness of said barrier material.

14. A barrier material as defined in claim 13 wherein said biaxially-oriented material is nylon.

15. A barrier material as defined in claim 13 wherein said biaxially-oriented material is selected from poly(ethylene terephalate) and polypropylene.

16. A barrier material as defined in claim 13 having a water-vapor transmission rate of less than about 0.012 grams of per 100 square inches per 24 hours.

17. A barrier material as defined in claim 13 comprising a polyurethane primer material between said biaxially-oriented polymeric film and said adhesive.

18. A barrier material as defined in claim 13 wherein said adhesive is polyethylene.

* * * * *